United States Patent [19]

Belke et al.

[11] 4,343,624
[45] Aug. 10, 1982

[54] ROTATING FLUIDIZED BED HYDROGEN PRODUCTION SYSTEM

[75] Inventors: William H. Belke, Peoria; George B. Grim, Washington, both of Ill.

[73] Assignee: Caterpillar Tractor Co., Peoria, Ill.

[21] Appl. No.: 145,064

[22] PCT Filed: Dec. 10, 1979

[86] PCT No.: PCT/US79/01089
§ 371 Date: Dec. 10, 1979
§ 102(e) Date: Dec. 10, 1979

[51] Int. Cl.$^3$ .............................................. C10J 3/56
[52] U.S. Cl. ................................... 48/61; 165/104.16; 422/142; 422/145; 422/146
[58] Field of Search ............... 48/61, 197 R; 422/142, 422/145, 146, 147, 209; 423/658; 431/7; 60/39.12, 39.35; 165/104 F, 104.16

[56] References Cited
U.S. PATENT DOCUMENTS

| | | | |
|---|---|---|---|
| 3,031,287 | 4/1962 | Benson et al. | 48/197 R |
| 4,161,103 | 7/1979 | Horgan et al. | 60/39.35 |
| 4,177,636 | 12/1979 | Horgan . | |
| 4,183,208 | 1/1980 | Horgan et al. . | |
| 4,255,135 | 3/1981 | Grim | 60/39.35 |
| 4,282,009 | 8/1981 | Belke et al. | 48/61 |
| 4,313,301 | 2/1982 | Belke et al. | 165/104.16 |

OTHER PUBLICATIONS

J. Swithenbank, Rotating Fluidized Bed Combuster/-Gasifier, University of Sheffield.
Demircan, et al, "Rotating Fluidized Bed Combuster", Fluidization, Cambridge University Press (1978), pp. 270–275.
Broughton, et al, "Heat Transfer and Combustion in Centrifugal Fluidized Bed", I. Chem E. Sympos. Ser. No. 43 (Jun. 1975).

Primary Examiner—Peter F. Kratz
Attorney, Agent, or Firm—Sixbey, Bradford and Leedom

[57] ABSTRACT

A three stage hydrogen generator (10), comprises a low BTU, carbon monoxide and hydrogen containing gas generation stage, a first reactor stage (12) for exothermically reducing ferric oxide with the low BTU gas and for generating superheated steam and a second reactor stage (14) for endothermically reacting steam and iron to produce substantially pure hydrogen gas. The hydrogen gas together with unreacted steam from the third stage (16) is directed to a condenser (18), preferably an air cooled unit, wherein the steam is condensed and the hydrogen gas recovered. The condensate (20) is cycled back to the second reactor (14) as the feed water for generating superheated steam and the heated cooling air (22) is directed to the first stage (12) for use in the generation of the low BTU gas. At least one, and preferably all, of the stages utilize a rotating fluidized bed. Desirably the condenser (18) is a rotating fluidized bed heat exchanger.

33 Claims, 4 Drawing Figures

ROTATING FLUIDIZED BED HYDROGEN PRODUCTION SYSTEM

TECHNICAL FIELD

The present invention relates generally to the production of hydrogen and, more particularly, to a method and rotating fluidized bed apparatus for the production of hydrogen by the iron-steam process.

BACKGROUND ART

In recent years fluidized beds have found many diverse uses in power generating systems and chemical processes. They have served as chemical reactors, particularly for finely divided materials; as incinerators for liquid, solid or gaseous substances; as pressurized or atmospheric, coal-, lignite-, petroleum-, peat-, wood- and/or paper-fired boiler or combustor units for power generation; and, as sites for various process treatments such as drying, baking, coating, oxidizing, etc.

Typically, fluidized beds which are in use today are static beds established when air or other fluidizing gas is introduced into a plenum chamber under pressure and forced upwardly through a diffusing medium (e.g., membrane, grate) to a superimposed chamber containing a particulate bed, of inert or reactive, finely divided, pulverulent solid material. Gas, forced upwardly through the diffusing medium into the fluidizing chamber under a sufficient predetermined pressure, fluidizes the particulates. The gas pressure required to accomplish this is determined, in part, by the nature and degree of fineness of the particulates to be fluidized. Other influencing factors are the depth of the bed and the size, number and design of the plenum chamber compartments and passages into the superimposed fluidizing chamber.

The rate at which a chemical reaction takes place in a fluidized bed between a solid material and a gaseous agent depends to a major extent on the rate at which the reactants are brought together, the rate at which the heat of reaction is furnished or removed and the rate at which the reaction products are removed. In conventional static fluidized beds, the rate at which the fluidizing gaseous agent, which by and large also serves as the fluidizing agent, can be blown through the bed is limited by the fact that the fluidizing currents within the fluidized zone are vertical, i.e., only the gravity force on the bed particles opposes the balancing gaseous agent force needed to maintain fluidization. If the force opposing the balancing fluidizing force could be increased, then the fluidizing agent flow rate through the bed and the reaction rate of the system would be increased. This can be accomplished using rotating fluidized beds wherein the fluidizing gaseous agent forced through the bed from its periphery opposes the centrifugal force tending to throw the bed particles outwardly from the bed axis of rotation toward the bed periphery. The extent of the centrifugal force and, thus, of the opposing fluidizing gaseous agent rate can be controlled by controlling the speed of bed rotation.

The principal advantages of a rotating fluidized bed over a static fluidized bed are the reduced volume necessary to produce a specified energy density, e.g., energy densities of 200 megawatts per cubic meter are attainable; improved chemical reaction rate, primarily attributable to the rapid diffusion of reactants, enhanced mixing and rapid removal of chemical reaction products; and very high heat transfer rates, the values for the heat transfer coefficient between the bed and surfaces within the bed having been reported on the order of 240 BTU/hr-ft$^2$-°F. compared with 180 BTU/hr-ft$^2$-°F. in a static fluidized bed and 10–25 BTU/hr-ft$^2$-°F. in conventional, nonfluidized bed environments.

A form of rotating fluidized bed system has been suggested by J. Swithenbank in his article "Rotating Fluidized Bed Combustor/Gasifier". The Swithenbank system includes a vertical shaft around which rotates a generally cylindrical combustor using natural gas as the fuel. The gas is introduced at the center of the combustor, i.e., along the axis of rotation, and is mixed with fluidizing air forced through the bed particles from the bed periphery toward the center. The bed, which is heated by the combustion heat generated and the mixing action accompanying rotation, preheats the entering fluidizing air. Most of the combustion between the heated air and the natural gas appears to occur outside, rather than within, the bed itself. Cooling coils passing through the bed carry air which is heated by the combustion and serve to control the bed and exhaust gas temperature. Swithenbank states that his combustion system may be operated by burning or gasifying coal granules in the fluidized bed, but discloses no combustor configuration suitable for use with coal fuels. Moreover, Swithenbank's configuration, requiring introduction of the fuel along the axis of rotation, detracts from the attainment of maximum energy density because it diminishes the compactness of the system. See also, Demircan et al, *Rotating Fluidized Bed Combustor*, published in "Fluidization" by Cambridge University Press (1978). Other publications of interest in connection with the heat transfer and combustion characteristics of natural gas fueled rotating fluidized beds are J. Broughton and G. E. Elliott, *Heat Transfer and Combustion in Centrifugal Fluidized Bed*, I. Chem E. Symposium Series No. 43 (paper presented at June 1975 meeting) and G. C. Lindauer et al, *Experimental Studies on High Gravity Rotating Fluidized Bed*, U.S. Atomic Energy Commission, BNL-50013 (September 1966).

One well known process for the production of hydrogen is the steam-iron process wherein iron (Fe) is oxidized by steam ($H_2O$) to ferric oxide ($Fe_3O_4$) and hydrogen is produced. This process, when practiced in the conventional manner using conventional retorts, is believed to be superior, to other hydrogen production processes such as the electrothermal and steam-oxygen process. Nevertheless, the steam-iron process as presently practiced is relatively low in thermal efficiency, purity of hydrogen-rich gases produced and reaction rates and relatively uneconomical in terms of the bulk and weight of equipment necessary.

Accordingly, the present invention is directed to overcoming one or more of the problems as set forth above.

DISCLOSURE OF INVENTION

In one aspect of the present invention this is accomplished by providing a multi stage hydrogen generator and method for generating hydrogen wherein a first stage produces a relatively low BTU gas, a second stage utilizes the gas in an exothermic reaction to reduce ferric oxide to iron and to generate steam, and a third stage reacts the generated steam and iron produced in the second stage to generate hydrogen. At least one of the stages utilizes a rotating fluidized bed system to provide enhanced reaction efficiency and economy of operation.

In another aspect of the invention, the multistage hydrogen generator includes a condenser to cool the hydrogen rich gas stream generated in the third stage. The steam portion of the gas stream is condensed and the condensate utilized in second stage steam generation.

In a particularly preferred form of the invention, a rotating fluidized bed is used in each of the stages to accelerate the chemical reactions, and a rotating fluidized bed heat exchanger is used as the condenser. The hydrogen produced by the multistage generator of the present invention exceeds 99% in purity and can usefully serve as the fuel in a gas turbine or other combustion engine.

BRIEF DESCRIPTION OF DRAWINGS

FIG. 3 shows the manner in which FIGS. 2A and 2B are assembled.

BEST MODE FOR CARRYING OUT THE INVENTION

Figure 1:
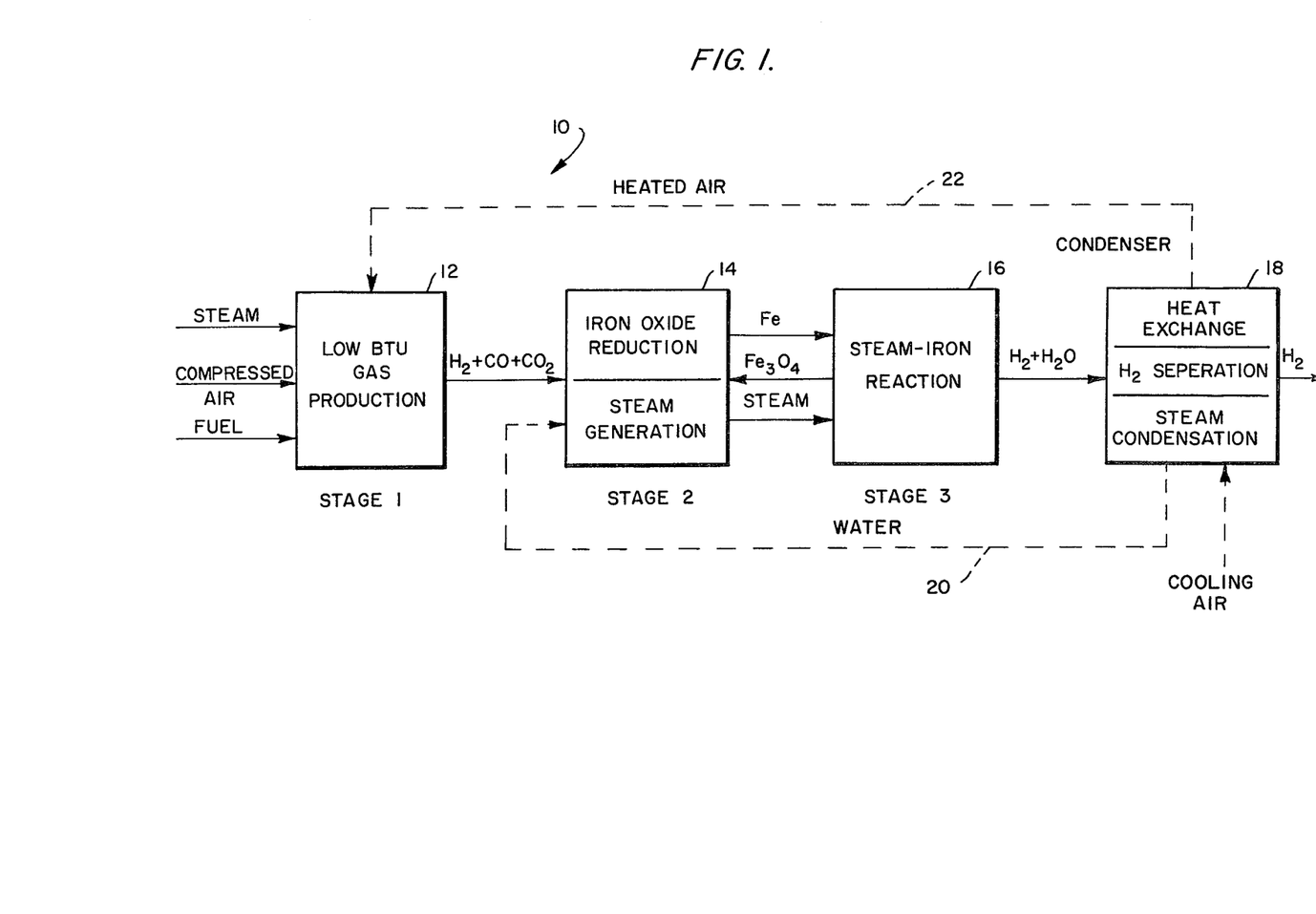
FIG. 1 is a block diagram of a three stage preferred hydrogen generator system of the present invention.

The multi stage hydrogen generator system of the present invention, utilizing a rotating fluidized bed in at least one of its stages for enhanced efficiency, economy and compactness, has wide utility whereever hydrogen generators may be used but, due to its outstanding compactness and high capacity, is particularly adaptable for fueling gas turbine engines in plants located on small sites and in relatively congested areas. Referring to FIG. 1 the general outline of the preferred three stage hydrogen generator system 10 of the present invention is more clearly depicted. As can be seen, the system 10 includes a first stage 12 in which a low BTU gas comprising at least hydrogen and carbon monoxide is produced for use in the second stage of the generator system. Typically, the first stage comprises a combustor-gasifier arrangement in which powdered coal is employed as the solid fuel. The coal exothermically reacts with oxygen (air) to produce carbon dioxide and approximately 174,000 BTU/mole of carbon combusted. Water fed to the combustor, generally in the form of steam, reacts endothermically with the carbon in the combustor at the high temperatures generated by the carbon-oxygen combustion reaction to produce carbon monoxide, carbon dioxide and hydrogen. The combustion and reaction product gases generated in the first stage 12 provide a low BTU gas (about 150–250 BTU/ft$^3$) feed to the second stage.

In the second stage 14 of the system, the low BTU gas from first stage 12 is reacted with ferric oxide (Fe$_3$O$_4$) to reduce the oxide to nearly pure iron (Fe) according to the following well known exothermic reaction:

The heat evolved from the reaction is extracted by steam generation means, such as a steam generator coil communicating with a source of water, to produce steam, preferably superheated steam, used in the third stage 16 of the system. The unreacted and reaction product gases leaving the second stage 14 are relatively lean and may be used for power generation or for other useful purposes in other portions of the system.

The relatively pure iron powder and the steam generated in second stage 14 are directed into third stage 16 wherein the steam and iron react to produce a relatively hot, hydrogen rich gas stream according to the following reaction:

Any heat required by this reaction may be derived from the superheat of the reactant steam. Desirably, the iron oxide produced is returned to the second stage 14 for use in the iron oxide reduction reaction taking place therein. The gas stream produced in the third stage comprises a mixture of reaction product hydrogen and unreacted steam. The hydrogen and steam are readily separated in condenser 18 wherein the relatively hot gas stream (at least about 212° F.) gives up thermal energy to air or water passed in heat exchange relationship thereto. The steam in the gas stream is caused to condense and may be directed, via condensate return line 20, into the second stage 14 of the generator system as the water source for the production of superheated steam. If air is used as a cooling medium in condenser 18, then the exiting heated air, at about 212° F., may be directed via air return line 22 back to the first stage 12 of the generator system as the combustion air source for reaction with the solid fuel therein.

In accordance with the present invention, at least one of stages 12, 14, 16 utilizes a rotating fluidized bed, for example, as the combustor-gasifier in first stage 12 and/or as a reaction chamber in second and/or third stages 14, 16. At the same time condenser 18 desirably comprises a rotating fluidized bed heat exchanger. To the extent that rotating fluidized beds are used in the various stages and in the condenser, the hydrogen generator system 10 benefits from improved heat transfer rates, enhanced mixing of reactants and accelerated chemical reaction rates, all contributing to increasing the compactness and capacity of the system. Where one or more stages and/or the condenser comprises conventional retorts or heat exchangers or even static fluidized beds, the over-all compactness and efficiency of the system suffers. However, system 10 is superior to existing hydrogen gas generation systems as long as at least one of the stages 12, 14, 16 utilizes a rotating fluidized bed.

Figure 2A:
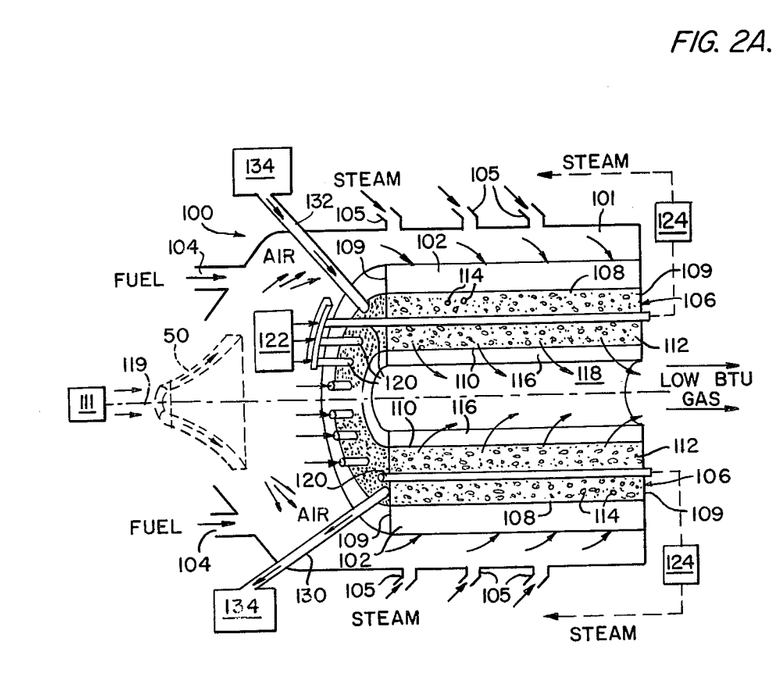
FIGS. 2A and 2B are composite drawings, comprising two sheets assembled along lines 2A and 2B, illustrating a side elevational schematic view of one embodiment of a three stage hydrogen generator of the present invention showing the use of rotating fluidized beds in each of the three stages and in the condenser.
Figure 2B:
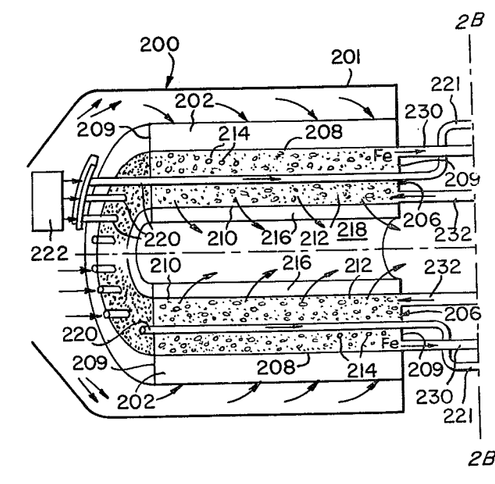
Figure 3:
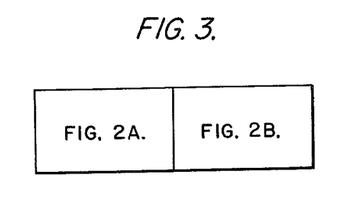

Referring to FIG. 2, a most preferred embodiment of system 10 is depicted wherein all stages 12, 14, 16 and condenser 18 utilize rotating fluidized beds. It should be understood that this embodiment is described to show how rotating fluidized beds can advantageously be employed in all stages of the system although it is appreciated that the rotating fluidized bed in one or more of the stages can be replaced by static fluidized beds or non-fluidized bed conventional equipment. First stage 12 is desirably a rotating fluidized bed combustor-gasifier unit 100 capable of compactly generating a low BTU gas comprising carbon monoxide and hydrogen for use in the second stage 14 of the system. Combustor-gasifier unit 100 includes a housing 101 through which compressed air is ducted into inlet plenum chamber 102. The compressed air is desirably preheated air. A compressor means 50, shown in phantom, may be employed to draw cool or preheated air into housing 101 and to compress the air. Alternatively, an external source of compressed air can be fed directly into inlet plenum chamber 102. Fuel fed through entry port 104 is mixed with the compressed air prior to entering the inlet plenum chamber 102 and is conveyed by the air to the rotating fluidized bed portion 106 of the combustor-gasifier. In a preferred embodiment the fuel is powdered coal, desirably solvent refined coal, to minimize ash removal problems. Steam is fed via steam inlets 105 to the rotating fluidized bed portion 106 through inlet plenum chamber 102. The compressed air and carbonaceous fuel are combusted in an exothermic reaction which produces combustion product gases and a large generation of heat within or immediately adjacent fluidized bed portion 106 to rapidly raise the temperature within the bed to the at least about 1800° F. range desired for the endothermic gasification reaction between carbon particles in the bed and the steam fed to inlet plenum chamber 102. Carbon monoxide and/or carbon dioxide and hydrogen are the reaction product gases which together with the combustion product gases, comprise the low BTU gas stream fed from first stage 14 to second stage 16.

The rotating fluidized bed portion 106 comprises an outer perforated cylindrical wall 108, an inner perforated cylindrical wall 110 and appropriate enclosing walls 109 defining therebetween an annular fluidizing chamber 112 in which pulverulent solid particles 114 are disposed. The perforations in walls 108 and 110 are small enough to contain particles 114 within chamber 112 and to control the exhaust of solid combustion and reaction products but large enough to permit the entry of powdered fuel and to sustain the free flow of steam and fluidizing air from the inlet plenum chamber 102 through wall 108, into and through chamber 112, through wall 110 and into outlet plenum chamber 116. The fluidized bed portion 106 rotates on horizontal, vertical or other appropriate axis, preferably about a longitudinal axis 119 which corresponds to the axis of coaxial cylindrical walls 108, 110. Rotation is motivated by available rotational means 111, such as appropriate gearing to drives for conventional engine functions, and is controlled to a speed sufficient to impart a centrifugal force to the particles 114 within the bed. The centrifugal force causes the particles 114 to gravitate away from axis 119 toward outer perforated wall 108. The flow of air and steam from inlet plenum chamber 102 through perforated outer wall 108 opposes the centrifugally induced movement of the particles 114 and, in so doing, fluidizes the bed. Combustion occurs within the fluidizing chamber 112 between the fluidizing air and the fuel, e.g., powdered coal, to produce hot combustion gases and release a large amount of thermal energy within the bed. Combustion may also occur outside the fluidizing chamber 112, for example within elongated cylindrical core chamber 118. As long as temperatures within the fluidized bed are maintained sufficiently high for the desired gasification reaction to occur, e.g. about 1800° F. to generate carbon monoxide and hydrogen, reaction occurs within the fluidizing chamber 112 between the fluidizing steam and the carbon particles, e.g., powdered coal, in the bed to produce hot reaction product gases within the bed. These hot reaction product gases and hot combustion gases are swept out of the bed through inner perforated wall 110 by the continuing flow of air and steam through the bed. The unreacted air and steam and the hot combustion and reaction product gases pass from outlet plenum chamber 116 into core 118 where they mix with any combustion gases which may have formed as a result of combustion within core 118. In the preferred embodiment, core 118 is an elongated cylindrical chamber which directs the flow of unreacted air and steam and combustion and reaction product gases to the second stage 14 of system 10.

The bed particles 114 are preferably an admixture of inert materials, e.g., sand, dolomite, other sulfur absorbers, or any other inert material generally found suitable for use in fluidized beds, and a carbonaceous fuel, such as powdered coal. For example, a suitable combination of materials comprises a particulate mixture of coal, dolomite, sand and coal ash. A generally useful proportion of bed particles is 95% inert materials, 5% fuel. As the reactions with air and steam proceed, coal ash is formed and becomes a part of the inert particulate portion of the bed. Spent bed material is removed from the bed through bed reclaiming outlet conduit 130. Any ash and sulfur in the spent bed material may be separated and removed by separation means 134 and the reclaimed bed material returned to the bed through bed reclaiming return conduit 132. If solvent refined coal is used, ash and sulfur removal is generally not a significant problem since this type coal permits operation for lengthy periods without any interruption.

The combustion temperature within the combustor-gasifier bed is controlled in part by the ratio of air to fuel fed into the bed. In addition, bed temperature may be controlled by controlling the amount of heat transferred to or from the bed tubes (or coils) 120 which pass substantially longitudinally through the bed. The tubes 120 may, if desired, be used to generate steam from water supplied thereto from steam/water supply source 122. Alternatively, tubes 120 may be used to superheat steam furnished by source 122. The resulting steam exiting tubes 120 may be collected or recovered in steam collection chamber 124 and optionally directed into inlet plenum chamber 102 to comprise all or a part of the steam supply to the combustor-gasifier. By predetermining the rate of flow of water or steam through the tubes 120, localized temperatures within the bed are readily controlled. It is recommended to control the temperature of the bed in such a manner that carbon-water gasification reaction temperatures of at least about 1800° F. are maintained in at least portions of the bed.

The carbon monoxide and hydrogen containing low BTU gas from combustor-gasifier 100 is directed to the second stage 14 of system 10 which is a rotating fluidized bed reactor 200 wherein ferric oxide ($Fe_3O_4$) is reduced to nearly pure iron (Fe). Reactor 200 includes a housing 201 through which the low BTU gas from first stage 12 is ducted into inlet plenum chamber 202. The low BTU gas acts as the fluidizing medium for the solid particles in the rotating fluidized bed portion 206 of reactor 200 and reacts exothermically with the ferric oxide particles in bed portion 206 to produce iron (Fe) and a gas stream comprising carbon dioxide and steam.

The rotating fluidized bed portion 206 comprises an outer perforated cylindrical wall 208, an inner perforated cylindrical wall 210 and appropriate enclosing walls 209 defining therebetween an annular fluidizing chamber 212 in which pulverulent solid particles 214 are disposed. The perforations in walls 208 and 210 are small enough to contain particles 214 within chamber 212 and to control the exhaust of solid reaction products but large enough to sustain the free flow of fluidizing gas from the inlet plenum chamber 202 through wall 208, into and through chamber 212, through wall 210 and into outlet plenum chamber 216. The fluidized bed portion 206 rotates on horizontal, vertical or other appropriate axis, preferably about a longitudinal axis 119 which corresponds to the axis of coaxial cylindrical walls 208, 210 and to the axis of combustion-gasifier 100. Rotation is motivated by available rotational means 111, such as appropriate gearing to drives for conventional engine functions, and is controlled to a speed sufficient to impart a centrifugal force to the particles 214 within the bed. The centrifugal force causes the particles 214 to gravitate away from axis 119 toward outer perforated wall 208. The flow of low BTU gas from inlet plenum chamber 202 through perforated outer wall 208 opposes the centrifugally induced movement of the particles 214, and, in so doing, fluidizes the bed. Reaction occurs within the fluidizing chamber 212 between the fluidizing gas and the ferric oxide to produce nearly pure iron and reaction product gases and releases a large amount of thermal energy within the bed. These reaction product gases are swept out of the bed through inner perforated wall 210 by the continuing flow of low BTU gas through the bed. The unreacted low BTU gas and the hot reaction product gases pass from outlet plenum chamber 216 into core 218 of reactor 200. In the preferred embodiment, core 218 is an elongated cylindrical chamber which directs the flow of unreacted and reaction product gases, which at this point is a lean gas stream at high temperature to other portions of the system 10 for power generation or other uses.

The bed particles 114 are an admixture of ferric oxide and nearly pure iron. Preferably, the ferric oxide concentration is greatest adjacent inner perforated wall 210 and the iron concentration in greatest adjacent outer perforated wall 208. This facilitates the continuous cycling of Fe and $Fe_3O_4$ between second stage 14 and third stage 16. It will be appreciated that as the reaction between the fluidizing gas from first stage 12 and ferric oxide proceeds, the ferric oxide particles in the bed are reacted and the concentration of iron increases. The iron formed by the reaction in second stage 14 is transferred, preferably continuously, via iron feed conduit 230 to the rotating fluidized bed portion 306 of third stage reactor 300. The ferric oxide content of bed portion 206 is replenished, preferably continuously, by transferring the ferric oxide formed in reactor 300 back to bed portion 206 via ferric oxide return conduit 232.

The reaction temperature within the fluidized bed portion 206 of reactor 200 is controlled in part by the rate at which first stage low BTU gas is fed into bed portion 206. In addition, bed temperature may be controlled by controlling the amount of heat transferred to the bed tubes (or coils) 220 which pass substantially longitudinally through the bed. The tubes 220 may, if desired, be used to generate steam from water supplied thereto from a readily available water supply source 222. A preferred water supply source is the condensate resulting from cooling third stage reaction product gas in condenser 18. The resulting steam exiting tubes 220 may most usefully be directed via tubes 221 into the inlet plenum chamber 302 of third stage reactor 300 to comprise all or a part of the fluidizing steam supply thereto. By pre-determining the rate of flow of water through the tubes 220, localized temperatures within the bed and the quantity and characteristics of steam generated within tube 220 are readily controlled.

The third stage 14 of system 10 comprises a rotating fluidized bed iron-steam reactor 300 wherein nearly pure iron is reacted with steam to produce a relatively hot gas stream which is relatively rich in hydrogen and contains unreacted steam. The reactant steam, preferably superheated, is furnished to inlet plenum chamber 302 of reactor 300 via tubes 221. The steam acts as the fluidizing medium for the solid particles in the rotating fluidized bed portion 306 of reactor 300 and provides whatever thermal energy may be necessary to react with the iron in bed portion 306 to produce ferric oxide and the hydrogen rich hot gas stream.

The rotating fluidized bed portion 306 comprises an outer perforated cylindrical wall 308, an inner perforated cylindrical wall 310 and appropriate enclosing walls 309 defining therebetween an annular fluidizing chamber 312 in which pulverulent solid particles 314 are disposed. The perforations in walls 308 and 310 are small enough to contain particles 314 within chamber 312 and to control the exhaust of solid reaction products but large enough to sustain the free flow of fluidizing steam from the inlet plenum chamber 302 through wall 308, into and through chamber 312, through wall 310 and into outlet plenum chamber 316. The fluidized bed portion 306 rotates on horizontal, vertical or other appropriate axis, preferably about a longitudinal axis 119 which corresponds to the axis of coaxial cylindrical walls 308, 310 and to the axis of combustor-gasifier 100 and reactor 200. Rotation is motivated by available rotational means 111, such as appropriate gearing to drives for conventional engine functions, and is controlled to a speed sufficient to impart a centrifugal force to the particles 314 within the bed. The centrifugal force causes the particles 314 to gravitate away from axis 119 toward outer perforated wall 308. The flow of steam from inlet plenum chamber 302 through perforated outer wall 308 opposes the centrifugally induced movement of the particles 314 and, in so doing, fluidizes the bed. Reaction occurs within the fluidizing chamber 312 between the fluidizing steam and the iron to produce ferric oxide and hot reaction product gas, primarily hydrogen, within the bed. A hot reaction product gas stream is swept out of the bed through inner perforated wall 310 by the continuing flow of steam through the bed. The unreacted steam and the hot reaction product hydrogen gas pass from outlet plenum chamber 36 into core 318 of reactor 300. In the preferred embodiment, core 318 is an elongated cylindrical chamber which directs the flow of unreacted steam and reaction product hydrogen gas to a condenser 18 to separate the hydrogen gas from the steam.

The bed particles 314 are an admixture of ferric oxide and nearly pure iron. Preferably, the ferric oxide concentration is greatest adjacent inner perforated wall 310 and the iron concentration is greatest adjacent outer perforated wall 308. This facilitates the continuous cycling of Fe and $Fe_3O_4$ between second stage 14 and third stage 16. It will be appreciated that as the reaction between the fluidizing steam from second stage 14 and iron proceeds, the iron particles in the bed are oxidized and the concentration of ferric oxide increases. The ferric oxide formed by the reaction in third stage 16 is transferred, preferably continuously, via ferric oxide feed conduit 232 to the rotating fluidized bed portion 206 of second stage reactor 200. The iron content of bed portion 306 is replenished, preferably continuously, by transferring the iron formed in reactor 200 to bed portion 306 via iron return conduit 230.

The hydrogen content of the hydrogen rich gas stream exiting the third stage reactor 300 via core chamber 318 is readily recoverable in a condenser unit 18 wherein the relatively pure (99+%) hydrogen may be separated from the steam content of the stream. A preferred condenser unit is a rotating fluidized bed heat exchanger 400 wherein the hydrogen-steam hot gas stream is passed in heat transfer relationship with a relatively cool heat exchange fluid, preferably cooling air. Thermal energy from the hot gas stream is transferred to the cooling air to cause the steam in the hot gas stream to condense and the cooling air to become heated to about 212° F. The condensate is desirably returned via condensate return line 20 to water source 222 feeding tubes 220 of reactor 200 for the production of superheated steam. The heated air is usefully compressed, as necessary, and utilized as the compressed air ducted via heated air return line 22 into housing 101 and inlet plenum 102 of combustor-gasifier 100.

The rotating fluidized bed heat exchanger 400 used as condenser 18 comprises a housing 401 which includes an inlet plenum chamber 402 into which the relatively hot, hydrogen rich gas stream passes and is directed through the rotating fluidized bed of the heat exchanger as the heating and fluidizing medium therefor. The relatively hot gas stream gives up a portion of its thermal energy in passing through the heat exchanger 400 and exits as condensed steam and hydrogen. The thermal energy transferred from the relatively hot gas stream heats the fluidized bed particles and heats a relatively cool second fluid, for example, compressed inlet air, which is directed through heat exchange tubes disposed within the fluidized bed.

The fluidized bed portion 406 of heat exchanger 400 comprises an outer perforated cylindrical wall 408, an inner perforated cylindrical wall 410 and appropriate enclosing walls 409 defining therebetween an annular fluidizing chamber 412 in which pulverulent solid inert particles 414 such as sand, dolomite, coal ash, etc., are disposed. The perforations in walls 408 and 410 are small enough to contain particles 414 within chamber 412 but large enough to sustain the free flow of the relatively hot fluidizing gas stream from the inlet plenum chamber 402 through wall 408, into and through chamber 412, through wall 410 and outlet plenum chamber 416 and into outlet core chamber 418.

The fluidized bed portion 406 rotates on horizontal, vertical or other appropriate axis, preferably about a longitudinal axis 119 which corresponds to the axis of coaxial cylindrical walls 408 and 410 and to the axis of combustor-gasifier 100 and reactors 200 and 300. Rotation is motivated by available rotational means 111, such as appropriate gearing to drives for conventional engine functions, and is controlled to a speed sufficient to impart a centrifugal force to the particles 414 within the bed. The centrifugal force causes the particles 414 to gravitate away from axis 119 toward outer perforated wall 408. The flow of hot gas from inlet chamber 402 through perforated outer wall 408 opposes the centrifugally induced movement of the particles 414 and, in so doing, fluidizes the bed. The thermal energy of the hot gas heats the bed particles and the compressed air flowing within the heat exchanger tubes 420 which extend substantially longitudinally through the bed. The resulting cooled hydrogen gas and condensate leave the bed through perforated wall 410 and pass through outlet plenum chamber 418 into outlet core chamber 418 of heat exchanger 400. In the embodiment illustrated in FIG. 2, core 418 is an elongated cylindrical chamber which directs the flow of cooled hydrogen gas through gas-liquid separation means (not shown) into appropriate collection means (not shown). The condensate is ducted via condensate return line 20 to water source 222.

The temperature within the bed is controlled in part by the temperature and flow rate of the hot gas stream fed into the bed. In addition, bed temperature is controlled by controlling the amount of heat transfer to cooling tubes (or coils) 420 which pass substantially longitudinally through the bed. Tubes 420 generally rotate with the bed although it is not necessary that they do. In a preferred embodiment the tubes 420 direct the flow of compressed air longitudinally within the bed from an air inlet 422 generally adjacent perforated wall 410 to an air outlet 424 generally adjacent perforated wall 408. In this manner, the compressed air flows generally countercurrently to the direction of fluidizing hot gas stream flow through the bed. More specifically, tubes 420 include an inlet tube 426 extending longitudinally from air inlet 422 along cylindrical wall 410, an outlet tube 428 extending longitudinally along cylindrical wall 408 to air outlet 424 and a plurality of tubes 429 interconnecting the inlet and outlet tubes 426, 428. The interconnecting tubes 429 extend generally radially between the inlet and outlet tubes 426, 428. Compressed air entering tubes 420 through air inlet 422 is directed longitudinally along the length of the fluidized bed portion 406 in inlet tube 426, radially relative to bed axis 119 in interconnecting tubes 429 and longitudinally along the length of the fluidized bed portion 406 in outlet tube 428 to air outlet 424. It is during the passage of the compressed air through the interconnecting tubes 429 that its flow is countercurrent or substantially opposite in direction to the flow of the fluidizing and heating hot gas stream through the bed. Desirably compressed air is fed to and ducted away from the tubes 420 through a combination of conduits and plenums (not shown). During passage through the tubes 420 the compressed air is heated and is directed from air outlets 424 to serve some useful purpose, for example as inlet air via heated air return line 22 to the combustor-gasifier 100.

In an alternative method for employing rotating fluidized bed heat exchanger 400, the hot, hydrogen rich gas stream is directed into and through tubes 420 and is cooled by the flow of fluidizing cooling air over the tubes 420. A condensed steam-hydrogen mixture exits tube outlets 424 and is directed through gas-liquid separation means (not shown) into hydrogen gas collection means (not shown) and condensate return line 20. The cooling air is introduced into heat exchanger 400 via inlet plenum chamber 402 through outer perforated wall 408 by oppose to centrifugal movement of and to fluidize particles 414 within chamber 412. The thermal energy of the hot gas stream within tubes 420 heats the bed particles, the tubes 420 and the cooling air flowing through the bed over the tubes. The heated air exits the bed via inner perforated wall 410 and outlet plenum chamber 416 and enters core chamber 418 from which it is directed to serve some useful purpose, such as inlet air via heated air return line 22 to the combustor-gasifier 100.

INDUSTRIAL APPLICABILITY

The multi-stage hydrogen generator system of the present invention has broad applicability but is particularly useful in the production of 99+% pure hydrogen for use in fueling combustion engines located on small sites and in relatively congested areas. Alternatively, the system may be usefully employed to produce hydrogen for use as a reagent for chemical processes, including upgrading of hydrocarbon fuels. The system is particularly advantageous when one or more of the stages comprises a rotating fluidized bed since these type fluidized beds contribute enhanced efficiency, economy and compactness.

A first stage rotating fluidized bed combustor-gasifier 10 100, upon rotation of fluidized bed portion 106, draws inlet, preferably preheated, compressed air, a solid fuel, such as powdered coal, and steam into its inlet plenum chamber 102, through outer perforated wall 108 into fluidization chamber 112. Inasmuch as the rotation of fluidized bed portion 106 causes the particles 114 within chamber 112, which are an admixture of carbon and inert materials, to gravitate toward outer wall 108, the opposing flow of the compressed air stream and steam into the chamber 112 fluidizes the particles. Combustion occurs within fluidizing chamber 112 between the compressed air and the powdered coal fuel to produce hot combustion gases the thermal energy within the bed. This raises the temperature of the bed to the at least about 1800° F. range desired for the endothermic gasification reaction between the carbon particles in the bed and the steam. The gasification reactions which take place produce hot reaction product gases, including carbon monoxide and hydrogen, which are swept out of the bed together with the hot combustion gases and the unreacted air and steam through inner perforated wall 110 by the continuing flow of fluidizing compressed air and steam through the bed. The unreacted compressed air, unreacted steam and the hot combustion and reaction product gases pass through outlet plenum chamber 116 into core 118 and are directed as the low BTU gas feed for reaction in the second stage reactor 200 of system 10.

The second stage reactor 200 comprises a housing 201 which receives the low BTU gas from the first stage combustor-gasifier 100 and directs it through inlet plenum chamber 202 and outer perforated wall 208 into fluidization chamber 212 to fluidize and react with a bed consisting essentially of ferric oxide and iron particles. The reaction which takes place between the carbon monoxide and hydrogen content of the low BTU fluidizing gas and the ferric oxide particles in the bed is exothermic and reduces the ferric oxide to iron. The generated heat is transferred to a plurality of tubes 220 which pass substantially longitudinally through the bed. The tubes have water flowing therethrough, preferably condensate from condenser 18, which is converted to steam or superheated steam for use in the third stage 14 of the system 10.

The superheated steam serves as the fluidizing medium in rotating fluidized bed reactor 300, passing from second stage 12 via tubes 220 to the inlet plenum chamber 302 of the third stage. The steam fluidizes and reacts in fluidization chamber 312 with the bed particles 314, consisting essentially of iron and ferric oxide, to convert the iron to ferric oxide and to produce hydrogen gas. Any heat required for the reaction is provided by the superheat of the steam. The hydrogen gas and unreacted steam exit fluidization chamber 312 through inner perforated wall 310 via outlet plenum chamber 316 and enter core chamber 318 which directs the hot, hydrogen rich gas stream to condenser 18. Ferric oxide and iron are continuously transferred via feed conduits 230 and 232, between the fluidization chambers 212, 312 of reactors 200, 300 to replenish the ferric oxide consumed in reactor 200 by the iron oxide formed in reactor 300 and to replenish the iron consumed in reactor 300 by the iron formed in reactor 200.

Desirably, condenser 18 is a rotating fluidized bed heat exchanger 400 in which the hydrogen rich gas stream is cooled by heat exchange with a flow of cooling air. Either the hydrogen rich gas stream or the cooling air may serve as the fluidizing medium for the inert particles in fluidization chamber 412. The other passes through chamber 412 in tubes 420 which pass substantially longitudinally through the bed. Preferably the fluidizing medium enters heat exchanger 400 via inlet plenum chamber 402, passes through outer wall 408 into fluidization chamber 412 to fluidize the particles therein, passes over tubes 420 and then exits chamber 412 through inner wall 410 and inlet plenum chamber 416 into core chamber 418. The air or hydrogen rich gas stream passing through tubes 420 flows from inlet tube 426 extending longitudinally along wall 408, to outlet tube 428 extending longitudinally along wall 410 through interconnecting tubes 429 extending generally radially between inlet and outlet tubes 426, 428. During the passage of fluid through interconnecting tubes 429, its flow is countercurrent or substantially opposite in direction to the flow of fluidizing medium through the bed.

The cooling air, heated during passage through rotating fluidized bed heat exchanger 400 is usefully directed back to combustor-gasifier 100 as the inlet air therefor. The steam content of the hydrogen rich gas stream is condensed in heat exchanger 400 and the condensate ducted back to reactor 200 as the water feed for steam generating tubes 220. The 99+% pure hydrogen gas is recovered and utilized, preferably as a gas tubine engine fuel.

Other aspects, objects and advantages of this invention can be obtained from a study of the drawings, the disclosure and the appended claims.

We claim:

1. A multi-stage hydrogen generation system (10) comprising:
   a. means (12) for producing a relatively low BTU gas comprising carbon monoxide and hydrogen;
   b. first reacting means (14) for exothermically reacting said relatively low BTU gas with ferric oxide to produce relatively pure iron and to generate steam;
   c. second reacting means (16) for reacting said generated steam with relatively pure iron to produce hydrogen gas;
   d. means (18) for recovering said hydrogen gas;
   e. at least one of said producing (12) and first and second reacting means (14,16) comprising a rotating fluidized bed, said rotating fludized bed including:
      (1) an outer substantially cylindrical, elongated perforated wall;
      (2) an inner substantially cylindrical, perforated wall spaced apart and substantially coaxial and co-extensive with said outer perforated wall;
      (3) enclosing walls defining within said outer and inner perforated walls a substantially annular fluid-ization chamber;
      (4) a fluidizable bed of pulverulent solid particles in said chamber;

(5) means for rotating said chamber about the axis to cause the particles to centrifugally gravitate toward said outer perforated wall;

(6) means for feeding a gaseous agent stream into said chamber through said outer perforated wall, said gas stream fluidizing said particles in said chamber, at least a portion of said gaseous stream exiting said chamber through said inner perforated wall; and (7) means for directing said exiting gaseous stream away from said chamber.

2. A system, as claimed in claim 1, wherein said means for recovering (18) includes condenser means (18) for separating said hydrogen gas from unreacted steam.

3. A system, as claimed in claim 1, wherein said producing means (12) comprises a rotating fluidized bed combustor-gasifier (100).

4. A system, as claimed in claim 1 wherein said first reacting means (14) comprises a first rotating fluidized bed reactor (200).

5. A system, as claimed in claim 1, wherein said second reacting means (16) comprises a second rotating fluidized bed reactor (300).

6. A system, as claimed in claim 2, wherein said condenser means (18) comprises a rotating fluidized bed heat exchanger (400).

7. A system, as claimed in claim 2, wherein said producing means (12) comprises a rotating fluidized bed combustor-gasifier (100), said first and second reacting means (14, 16) comprise first and second rotating fluidized bed reactors (200, 300) and said condenser means (18) comprises a rotating fluidized bed heat exchanger (400).

8. A system, as claimed in claims 3 or 7, wherein said rotating fluidized bed combustor-gasifier (100) comprises:

a. an outer substantially cylindrical elongated perforated wall (108);

b. an inner substantially cylindrical perforated wall (110) spaced apart and substantially coaxial and co-extensive with said outer perforated wall (108);

c. enclosing walls (109) defining within said outer and inner perforated walls (108, 110) a substantially annular fluidization chamber (112);

d. a fluidizable bed of pulverulent solid particles (114) in said chamber (112), said particles comprising a minor proportion of carbon particles and a major proportion of inert particles;

e. means (111) for rotating said chamber (112) about the axis (119) to cause the particles to centrigually gravitate toward said outer perforated wall (108);

f. means (20, 104, 102) for feeding a combustible fuel in a gaseous agent stream through said outer perforated wall (108) into said chamber (112), said fuel reacting with at least a portion of said gaseous agent in said chamber (112) to generate heat and to form gaseous combustion products exiting said chamber (112) through said inner perforated wall (110);

g. means (105, 102) for introducing steam through said outer perforated wall (108) into said chamber (112), said steam reacting with at least a portion of said carbon particles in said chamber (112) to form gaseous reaction products, said gaseous reaction products exiting said chamber (112) through said inner perforated wall (110);

h. means (120) for maintaining at least a portion of said particles (114) in said chamber (112) at a temperature conducive to said steam-carbon reaction;

i. means (116, 118) for receiving said gaseous combustion and reaction products, unreacted gaseous agent and unreacted steam exiting from said chamber (112) through said inner perforated wall (110) and j. for directing said unreacted steam, unreacted gaseous agent and said gaseous combustion and reaction products, comprising said carbon monoxide and hydrogen containing low BTU gas, exiting said inner perforated wall (110) to said first reacting means (12).

9. A system, as claimed in claim 8, wherein said means for feeding includes chamber means (102) communicating with said outer perforated wall (108) for combining said fuel with said gaseous agent prior to feeding said agent through said outer perforated wall (108).

10. A system, as claimed in claim 8, wherein said means for feeding includes compressor means (20), operatively associated with said chamber (112), for providing compressed air as said gaseous agent to said chamber (112).

11. A system, as claimed in claim 8, including means for removing spent bed particles from (130) and means for returning reclaimed bed particles to (132) said chamber (112).

12. A system as claimed in claims 4 or 7, wherein said first rotating fluidized bed reactor (200) comprises:

a. an outer substantially cylindrical elongated perforated wall (208);

b. an inner substantially cylindrical perforated wall (210) spaced apart and substantially coaxial and co-extensive with said outer perforated wall (208);

c. enclosing walls (209) defining within said outer and inner perforated walls (208, 210) a substantially annular fluidization chamber (212);

d. a fluidizable bed of pulverulent solid particles (214) in said chamber, said particles comprising a mixture of ferric oxide and iron particles;

e. means (111) for rotating said chamber (212) about the axis (119) to cause the particles to centrifugally gravitate toward said outer perforated wall (208);

f. means (118, 202) for feeding said low BTU gas from said producing means (12) into said chamber (212) through said outer perforated wall (208), said low BTU gas fluidizing said particles in said chamber (112) and reacting with said ferric oxide particles to form relatively pure iron and to generate heat;

g. at least one tube (220) extending substantially longitudinally through said chamber (212), means (222) for supplying water to said at least one tube (220), means (221) for recovering steam therefrom and for directing said steam to said second reacting means (300);

h. means (216, 218) for receiving unreacted low BTU gas exiting from said chamber (212) through said inner perforated wall (210) and directing said unreacted low BTU gas exiting said inner perforated wall (210) away from said chamber (212).

13. A system as claimed in claim 12, including means (300, 232) for replenishing the ferric oxide consumed in said chamber (212).

14. A system, as claimed in claims 5 or 7, wherein said second rotating fluidized bed reactor comprises:

a. an outer substantially cylindrical elongated perforated wall (308);
b. an inner substantially cylindrical perforated wall (310) spaced apart and substantially coaxial and co-extensive with said outer perforated wall (308);
c. enclosing walls (309) defining within said outer and inner perforated walls (308, 310) a substantially annular fluidization chamber (312);
d. a fluidizable bed of pulverulent solid particles (314) in said chamber (112), said particles comprising a mixture of ferric oxide and iron particles;
e. means (111) for rotating said chamber (312) about the axis (119) to cause the particles to centrifugally gravitate toward said outer perforated wall (308);
f. means (220) for feeding said generated steam from said first reacting means (200) into said chamber (312) through said outer perforated wall (308), said steam fluidizing said particles in said chamber (312) and reacting with said iron particles to form ferric oxide and to produce hydrogen;
g. means (316, 318) for receiving said hydrogen and unreacted steam exiting from said chamber (312) through said inner perforated wall (310) and directing said hydrogen and unreacted steam exiting said inner perforated wall (310) to said recovering means (18).

15. A system, as claimed in claim 14, including means (200, 230) for replenishing the iron consumed in said chamber (312).

16. A system, as claimed in claims 2 or 7, wherein said condenser means (18) comprises a rotating fluidized bed heat exchanger (400) and said rotating fluidized bed heat exchanger (400) comprises:
a. an outer substantially cylindrical elongated perforated wall (408);
b. an inner substantially cylindrical perforated wall (410) spaced apart and substantially coaxial and co-extensive with said outer perforated wall (408);
c. enclosing walls (409) defining within said outer and inner perforated walls (408, 410) a substantially annular fluidization chamber (412);
d. a fluidizable bed of inert pulverulent solid particles (414) in said chamber (412);
e. means (111) for rotating said chamber (412) about the axis (119) to cause the particles (414) to centrifugally gravitate toward said outer perforated wall (408);
f. means (402) for feeding said relatively hot hydrogen and unreacted steam gas stream from said second reacting means (300) into said chamber (412) through said outer perforated wall (408) and out of said chamber (412) through said inner perforated wall (410), said gas stream fluidizing and heating said particles (414) in said chamber (412);
g. at least one tube (420) in said chamber (412) extending substantially co-extensively with said walls (408, 410) for passing a relatively cool fluid therethrough, whereby said cool fluid is heated by the heated bed particles and said relatively hot gas stream and said steam content of said relatively hot gas stream condenses; and
h. means (22) for directing said heated fluid away from said chamber (412).

17. A system, as claimed in claims 2 or 7, wherein said condenser means (18) comprises a rotating fluidized bed heat exchanger (400) and said rotating fluidized bed heat exchanger (400) comprises:
a. an outer substantially cylindrical elongated perforated wall (408);
b. an inner substantially cylindrical perforated wall (410) spaced apart and substantially coaxial and co-extensive with said outer perforated wall (408);
c. enclosing walls (409) defining within said outer and inner perforated walls (408, 410) a substantially annular fluidization chamber (412);
d. a fluidizable bed of inert pulverulent solid particles (414) in said chamber (412);
e. means (111) for rotating said chamber (412) about the axis (119) to cause the particles (414) to centrifugally gravitate toward said outer perforated wall (408);
f. means (402) for feeding a relatively cool fluid into said chamber (412) through said outer perforated wall (408) and out of said chamber (412) through said inner perforated wall (410), said cool fluid fluidizing and cooling said particles (414) in said chamber (412);
g. at least one tube (420) in said chamber (412) extending substantially co-extensively with said walls (408, 410) for passing said relatively hot hydrogen and unreacted steam gas stream from said second reacting means (300) therethrough, whereby said gas stream gives up thermal energy to said bed particles and heats said cool fluid and said steam content of said relatively hot gas stream condenses; and
h. means (418, 22) for directing said heated fluid exiting said inner perforated wall (410) away from said chamber (412).

18. A system, as claimed in claim 16, wherein said at least one tube (420) directs the flow therein longitudinally within said chamber (412) from an inlet (422) generally adjacent said inner perforated wall (410) to an outlet (424) generally adjacent said outer perforated wall (408), whereby said relatively cool fluid flows countercurrently to said relatively hot gas stream.

19. A system, as claimed in claim 16, wherein said at least one tube (420) comprises an inlet tube (426) extending substantially co-extensively with and adjacent said inner perforated wall (410), an outlet tube (428) extending substantially co-extensively with and adjacent said outer perforated wall (408) and fluid flow means (429) interconnecting said inlet and outlet tubes (426, 428), whereby flow in said tube (420) enters said chamber (412) adjacent said inner perforated wall (410) and exits said chamber (412) adjacent said outer perforated wall (408).

20. A system, as claimed in claim 19, wherein said fluid flow means comprises at least one interconnecting tube (429), whereby flow in said interconnecting tube is countercurrent to fluidizing flow passing through said chamber (412).

21. A system, as claimed in claim 20, wherein said fluid flow means comprises a plurality of interconnecting tubes (429).

22. A system, as claimed in claim 16, wherein said cool fluid is air and including means (22) for directing said heated air to said producing means (12).

23. A system, as claimed in claim 16, including means (20) for directing said condensed steam to said first reacting means (14) for generating steam therefrom.

24. A system, as claimed in claim 8, wherein said means for maintaining a temperature conducive to said steam-carbon reaction includes at least one tube (120) extending substantially longitudinally through said chamber (112) for passing a heat exchange fluid therethrough.

25. A system, as claimed in claim 8, wherein the substantially cylindrical space enclosed by said inner perforated wall (110) comprises said means (116, 118) for receiving and directing said unreacted steam, unreacted gaseous agent, gaseous combustion products and gaseous reaction products.

26. A system as claimed in claim 12, wherein the substantially cylindrical space enclosed by said inner perforated wall (210) comprises said means (216, 218) for receiving and directing said unreacted low BTU gas away from said chamber (212).

27. A system, as claimed in claim 14, wherein the substantially cylindrical space enclosed by said inner perforated wall (310) comprises said means (316, 318) for receiving and directing said hydrogen and unreacted steam to said recovering means (18).

28. A system, as claimed in claim 17, wherein said at least one tube (420) directs the flow therein longitudinally within said chamber (412) from an inlet (422) generally adjacent said inner perforated wall (410) to an outlet (424) generally adjacent said outer perforated wall (408), whereby said relatively cool fluid flows counter-currently to said relatively hot gas stream.

29. A system, as claimed in claim 17, wherein said at least one tube (420) comprises an inlet tube (426) extending substantially co-extensively with and adjacent said inner perforated wall (410), an outlet tube (428) extending substantially co-extensively with and adjacent said outer perforated wall (408) and fluid flow means (429) interconnecting said inlet and outlet tubes (426,428), whereby flow in said tube (420) enters said chamber (412) adjacent said inner perforated wall (410) and exits said chamber (412) adjacent said outer perforated wall (408).

30. A system, as claimed in claim 17, wherein said cool fluid is air and including means (22) for directing said heated air to said producing means (12).

31. A system, as claimed in claim 17, including means (20) for directing said condensed steam to said first reacting means (14) for generating steam therefrom.

32. A system, as claimed in claim 29, wherein said fluid flow means comprises at least one interconnecting tube (429), whereby flow in said interconnecting tube is countercurrent to fluidizing flow passing through said chamber (412).

33. A system, as claimed in claim 32, wherein said fluid flow means comprises a plurality of interconnecting tubes (429).

* * * * *